US012332259B2

(12) United States Patent
Takahashi

(10) Patent No.: US 12,332,259 B2
(45) Date of Patent: Jun. 17, 2025

(54) ANALYSIS DEVICE

(71) Applicant: SHIMADZU CORPORATION, Kyoto (JP)

(72) Inventor: Kazuya Takahashi, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 902 days.

(21) Appl. No.: 17/436,603

(22) PCT Filed: Mar. 12, 2019

(86) PCT No.: PCT/JP2019/009898
§ 371 (c)(1),
(2) Date: Sep. 5, 2021

(87) PCT Pub. No.: WO2020/183597
PCT Pub. Date: Sep. 17, 2020

(65) Prior Publication Data
US 2022/0146541 A1  May 12, 2022

(51) Int. Cl.
*G01N 30/02* (2006.01)
*G01N 35/00* (2006.01)
(Continued)

(52) U.S. Cl.
CPC ....... *G01N 35/00712* (2013.01); *G01N 30/02* (2013.01); *G06F 1/266* (2013.01);
(Continued)

(58) Field of Classification Search
CPC ............. G01N 35/00712; G01N 30/02; G01N 2030/027; G01N 2030/8804; G01N 2035/00425; G06F 1/266
See application file for complete search history.

(56) References Cited

U.S. PATENT DOCUMENTS

2004/0216009 A1  10/2004  Kihara
2017/0082585 A1*  3/2017  DeWitte .............. H01J 49/0031
(Continued)

FOREIGN PATENT DOCUMENTS

CN  1532761 A  9/2004
JP  09-160632 A  6/1997
(Continued)

OTHER PUBLICATIONS

Office Action for corresponding CN Application No. 201980093666.7, dated Jan. 12, 2023, with English language machine translation.
(Continued)

*Primary Examiner* — Jill A Warden
*Assistant Examiner* — Michael Stanley Gzybowski
(74) *Attorney, Agent, or Firm* — Renner, Otto, Boisselle & Sklar, LLP

(57) ABSTRACT

There is provided an analysis device including one or a plurality of analysis units each including a unit main body that is a primary subject of an analysis operation, a first power supply configured to supply power to the unit main body, a unit controller configured to operate the unit main body according to a control signal input from an outside, and switch a connected state/disconnected state between the first power supply and the unit main body, and a second power supply configured to supply lower-voltage power to the unit controller than the first power supply (63); and a central controller configured to send a control signal to the unit controller of each of the one or plurality of analysis units.

8 Claims, 6 Drawing Sheets

(51) Int. Cl.
*G06F 1/26* (2006.01)
*G01N 30/88* (2006.01)

(52) U.S. Cl.
CPC .................. *G01N 2030/027* (2013.01); *G01N 2030/8804* (2013.01); *G01N 2035/00425* (2013.01)

(56) References Cited

U.S. PATENT DOCUMENTS

| | | | |
|---|---|---|---|
| 2017/0146500 A1 | 5/2017 | Kanazawa | |
| 2020/0033929 A1 | 1/2020 | Yokoi | |

FOREIGN PATENT DOCUMENTS

| | | | | |
|---|---|---|---|---|
| JP | 2000-304751 | A | 11/2000 | |
| JP | 2001-296301 | A | 10/2001 | |
| JP | 2002-333438 | A | 11/2002 | |
| JP | 2004-286663 | A | 10/2004 | |
| JP | 2007-024650 | A | 2/2007 | |
| JP | 2009-145272 | A | 7/2009 | |
| JP | 2014-163855 | A | 9/2014 | |
| TW | 201837647 | A | 10/2018 | |
| WO | 2015/198389 | A1 | 12/2015 | |
| WO | WO-2017033598 | A1 * | 3/2017 | ....... G01N 35/00712 |
| WO | 2018/189893 | A1 | 10/2018 | |

OTHER PUBLICATIONS

Office Action for corresponding JP Application No. 2021-504667, dated Mar. 22, 2023, with English language machine translation.
Office Action for corresponding Chinese Application No. 201980093666.7 dated Sep. 14, 2023, with English language machine translation.
Office Action for corresponding JP Application No. 2021-504667, dated Aug. 2, 2022, with English language machine translation (note: the machine translation of the Office Action indicates the author of the cited reference as "Takada Hirofumi", but the correct name is "Inada Hirofumi").
Inada Hirofumi, "Raspberry Pi-Control! Oscilloscope & multimeter automatic measurement system"; Interface; Oct. 2015 issue; with English language machine translation.
Office Action for corresponding Japanese Patent Application No. 2023-203834 dated Jun. 11, 2024, with English language machine translation.
Decision of Refusal for corresponding JP Application No. 2021-504667 dated Sep. 5, 2023, with English language machine translation.
Decision of Rejection for corresponding Chinese Application No. 201980093666.7 dated Dec. 27, 2023, with English language machine translation.
International Search Report for corresponding Application No. PCT/JP2019/009898, mailed Jun. 4, 2019.
Written Opinion for corresponding Application No. PCT/JP2019/009898, mailed Jun. 4, 2019.

* cited by examiner

Fig. 4

| SHUTDOWN SETTING | | |
|---|---|---|
| COOLDOWN TIME | XXX | min |

☑ LIQUID FEEDING UNIT
STOP LIQUID FEEDING PUMP

☐ AUTOSAMPLER
STOP TEMPERATURE CONTROL MECHANISM

☑ COLUMN OVEN
STOP TEMPERATURE CONTROL MECHANISM

☑ DETECTION UNIT
TURN OFF LAMP/STOP TEMPERATURE CONTROL MECHANISM

Fig. 8

| SHUTDOWN SETTING |
| COOLDOWN TIME  XXX min |
| ☑ LIQUID FEEDING UNIT<br>STOP LIQUID FEEDING PUMP |
| ☐ AUTOSAMPLER<br>STOP TEMPERATURE CONTROL MECHANISM |
| ☐ COLUMN OVEN<br>STOP TEMPERATURE CONTROL MECHANISM |
| ▨ DETECTION UNIT |

ANALYSIS DEVICE

TECHNICAL FIELD

The present invention relates to an analysis device such as a chromatograph.

BACKGROUND ART

Liquid chromatographs are widely used to identify and quantify components in a sample. In the liquid chromatograph, components in a sample are separated by a column, and each component is detected. In the liquid chromatograph, a sample is introduced into a column on a flow of a mobile phase fed at a predetermined flow rate, and the compounds in the sample are separated and measured.

Examples of the liquid chromatograph include an integrated liquid chromatograph and a unit type liquid chromatograph in which a plurality of individual units (also referred to as a module) are combined and interconnected. In the integrated liquid chromatograph, a main body which is a primary subject of an analysis operation, a system controller which sends control signals for operating the main body, and a power supply which supplies power to the main body and the system controller are integrally formed.

The unit type liquid chromatograph typically includes a liquid feeding unit, an autosampler, a column oven, a detection unit and a system controller. The liquid feeding unit is mainly composed of a mobile phase container in which a mobile phase is stored, and a pump which sucks and feeds the mobile phase. The autosampler includes an injector which injects a sample liquid into the mobile phase. The column oven accommodates a column which separates components contained in the sample liquid. The detection unit includes a detector which detects components eluted from the column. The liquid feeding unit, the autosampler, the column oven, and the detection unit are independent analysis units, and each unit includes a unit main body, a unit controller, and a power supply which supplies power to the unit main body and the unit controller. In the unit type liquid chromatograph, the combination of the analysis units can be changed according to the analysis purpose, and any of the analysis units can be updated.

Some integrated liquid chromatographs can be transitioned to a shutdown state at the end of analysis (for example, Patent Literature 1). The shutdown state is a state in which energization to the main body is stopped and only energization to the system controller is maintained. For example, in a case where there is no plan to perform the next analysis for a while after the analysis is ended, when a user performs an input operation to instruct the system controller to transition to the shutdown state, a control signal instructing to stop energization to the main body is sent from the system controller to the power supply, and the energization is stopped. When the user performs an input operation to release the shutdown state to the system controller, a control signal instructing restart of energization to the main body is sent from the system controller to the power supply, and supplying power is restarted. By the transition to the shutdown state at the end of analysis, power consumption during analysis standby is suppressed.

CITATION LIST

Patent Literature

Patent Literature 1: WO 2015/198389 A

SUMMARY OF INVENTION

Technical Problem

In the unit type liquid chromatograph, the power supply of each analysis unit can be turned off by sending such a control signal from the system controller to the unit controller of the analysis unit. However, when the power supply of the analysis unit is turned off, the energization to the unit controller is stopped, and the unit controller is no more operable. Therefore, even if the user performs an input operation to restart the energization to one of the analysis units from the system controller, the main body of the analysis unit cannot be operated. Therefore, in conventional unit type liquid chromatographs, it is necessary to maintain energization in each analysis unit even during analysis standby, and there is a problem that it is difficult to save power consumption.

Here, the problem in conventional art has been described using the liquid chromatograph as an example, but a unit type gas chromatograph and other various unit type analysis devices have the same problem as described above.

A problem to be solved by the invention is to realize, in a unit type analysis device in which one or a plurality of analysis units are operated under the control of a controller to execute a predetermined analysis operation, a shutdown state that can be set and released from the controller and has reduced power consumption.

Solution to Problem

An analysis device according to the invention for solving the problems includes one or a plurality of analysis units each including a unit main body that is a primary subject of an analysis operation, a first power supply configured to supply power to the unit main body, a unit controller configured to operate the unit main body according to a control signal input from an outside, and switch into either a connected state in which the first power supply and the unit main body are electrically connected or a disconnected state in which the first power supply and the unit main body are electrically disconnected, and a second power supply configured to supply lower-voltage power to the unit controller than the first power supply; and a central controller configured to send a control signal to the unit controller of each of the one or plurality of analysis units.

ADVANTAGEOUS EFFECTS OF INVENTION

The analysis device according to the invention includes one or a plurality of analysis units and a central controller. Each analysis unit includes a unit main body that is a primary subject of an analysis operation, a first power supply configured to supply power to the unit main body, a unit controller configured to operate the unit main body and switch between a connected state and a disconnected state, where in the connected state an electrical connection between the first power supply and the unit main body is made, and in the disconnected state no electrical connection is made, and a second power supply configured to supply lower-voltage power to the unit controller than the first power supply. When a control signal instructing an analysis operation is sent from the central controller to each unit, the unit controller of each analysis unit energizes the unit main body from the first power supply (connected state) to make the unit main body operable (analysis state). Then, the unit controller operates the unit main body according to the control signal from the central controller. On the other hand, when a control signal instructing analysis standby is sent from the central controller to each unit, the unit controller of each analysis unit stops the energization from the first power supply to the unit main body and brings about a disconnected state (shutdown state). As described above, in the analysis device according to the invention, the shutdown state can be set by sending a predetermined control signal to the unit controller of the analysis unit by an input operation to the central controller. In this shutdown state, since the energization from the first power supply to the unit main body is stopped, power consumption is saved.

On the other hand, since the energization from the second power supply to the unit controller is maintained in the analysis unit even in the shutdown state, the shutdown state can be released by sending a predetermined control signal from the central controller to the unit controller of the analysis unit.

BRIEF DESCRIPTION OF DRAWINGS

FIG. 4 is a display example of a screen for setting an analysis unit to be transitioned to a shutdown state in the present embodiment.

FIG. 8 is a display example of a screen for setting an analysis unit to be transitioned to a shutdown state in a modification.

DESCRIPTION OF EMBODIMENTS

Hereinafter, an embodiment of an analysis device according to the invention will be described with reference to the drawings. The analysis device of the present embodiment is a liquid chromatograph.

Figure 1:
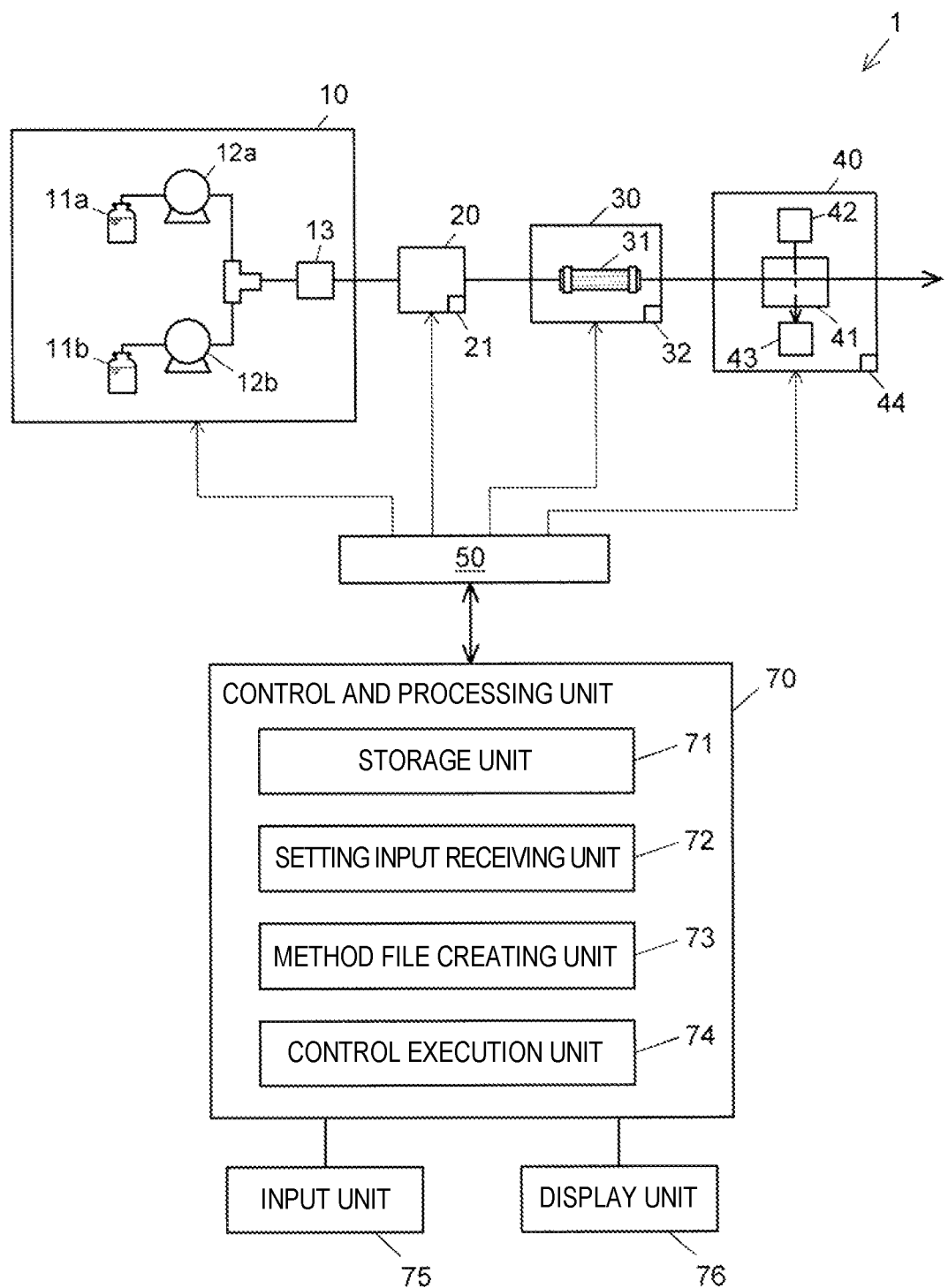
FIG. 1 is a configuration diagram of a main part of a liquid chromatograph which is an embodiment of an analysis device according to the invention.
Figure 2:
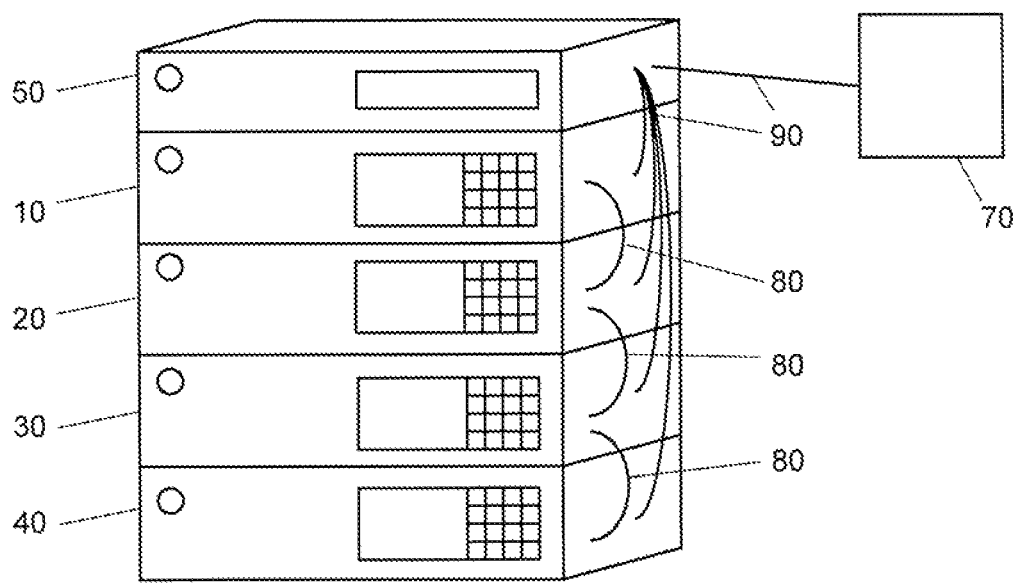
FIG. 2 is a diagram for describing units constituting the liquid chromatograph of the present embodiment.

FIG. 1 is a configuration diagram of a main part of a liquid chromatograph 1 of the present embodiment. The liquid chromatograph 1 includes a liquid feeding unit 10, an autosampler 20, a column oven 30, a detection unit 40, a system controller 50, and a control and processing unit 70. As illustrated in FIG. 2, the liquid feeding unit 10, the autosampler 20, the column oven 30, and the detection unit 40 are analysis units housed in independent housings. The analysis units are connected by a flow path 80 for feeding liquid. The control and processing unit 70 and the system controller 50, and the system controller 50 and each analysis unit are connected by a communication cable 90.

The liquid feeding unit 10 includes containers 11a and 11b that store solutions of mobile phases, liquid feeding pumps 12a and 12b that feed the solutions in the containers 11a and 11b, and a mixer 13 that mixes the two types of solutions. A column 31 is accommodated in the column oven 30.

The mobile phase prepared by the liquid feeding unit 10 is introduced into the columns 31 in the column oven 30 through the autosampler 20. In the autosampler 20, one or a plurality of liquid samples to be analyzed are set in advance. The inside of the autosampler 20 is maintained at a predetermined temperature by a temperature control mechanism 21 (typically, a cooler) in order to prevent the liquid sample from being volatilized or altered. In the autosampler 20, one or a plurality of liquid samples to be analyzed set inside the autosampler 20 are sequentially injected into the mobile phase. The liquid sample injected into the mobile phase is carried by the flow of the mobile phase and passes through the column 31.

The column oven 30 includes the column 31 and a temperature control mechanism 32 (typically, a heater) of the column 31 therein. The components in the sample are temporally separated while passing through the column 31, and the components eluted from the column 31 are sequentially introduced into the detection unit 40.

The detection unit 40 of the present embodiment is a UV detector, and includes a flow cell 41, a lamp 42, and a spectroscopic detector 43. In the detection unit 40, in a state where the lamp 42 is turned on, components eluted from the column 31 are sequentially introduced into the flow cell 41, and the intensity of light passing through the flow cell 41 is measured. In addition, a temperature control mechanism 44 (typically, a heater) that controls the temperature of the inside of the detection unit 40 is provided.

The control and processing unit 70 includes a setting input receiving unit 72, a method file creating unit 73, and a control execution unit 74 as functional blocks in addition to a storage unit 71. The storage unit 71 stores, for each analysis unit, a command to be sent to the system controller 50 to execute each of a process at the time of shutdown and a process at the time of warm-up, and information on the required time for each process. The storage unit 71 also stores an analysis method file in which measurement conditions of the sample are described, data acquired during measurement of the sample, an analysis result thereof, and the like. The entity of the control and processing unit 70 is a personal computer, and the above-described functional blocks are embodied by executing a predetermined program installed in the computer in advance. An input unit 75 including a keyboard and a mouse and a display unit 76 are connected to the control and processing unit 70.

Figure 3:
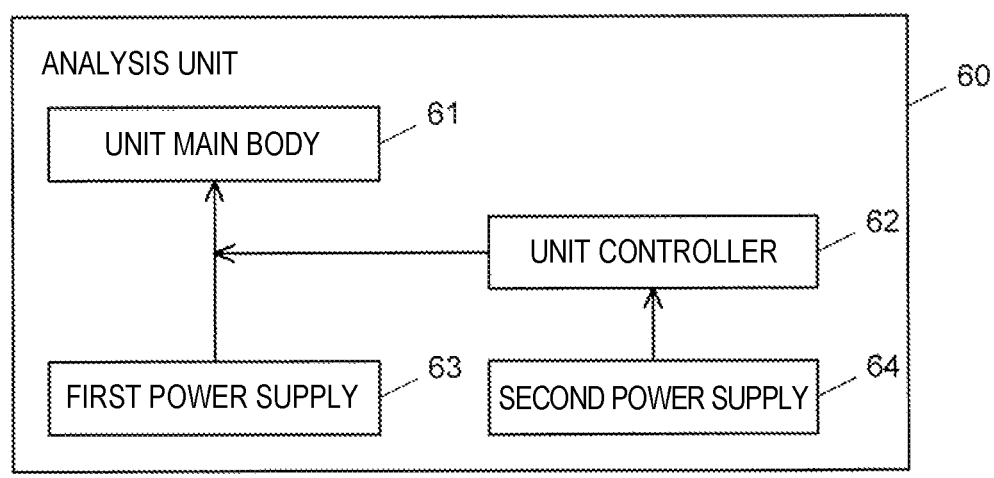
FIG. 3 is a diagram for describing a configuration of an analysis unit included in the liquid chromatograph of the present embodiment.

FIG. 3 is a block diagram illustrating a configuration of each analysis unit 60. In the following description, items common to the liquid feeding unit 10, the autosampler 20, the column oven 30, and the detection unit 40 will be referred to as the analysis unit 60. Each analysis unit includes a unit main body 61, a unit controller 62, a first power supply 63, and a second power supply 64. The unit main body 61 is a part corresponding to a primary subject of an operation of the analysis unit 60, and for example, in the case of the liquid feeding unit 10, the liquid feeding pumps 12a and 12b which feed the mobile phase and the mixer 13 are included in the unit main body 61. In the case of the autosampler 20, the temperature control mechanism 21 of the autosampler 20, a drive unit (not illustrated) of a sampling needle which collects a sample, and the like are included in the unit main body 61. In the case of the column oven 30, the temperature control mechanism 32 which controls the temperature of the column 31 is included in the unit main body 61. In the case of the detection unit 40, a drive source of the lamp 42, a drive source of the spectroscopic detector 43, and the temperature control mechanism of the detection unit 40 are included in the unit main body 61.

Power is supplied from the first power supply 63 to the unit main body 61. In the present embodiment, the first power supply 63 is a power supply with an output of 24 V, and the second power supply 64 is a power supply with an output of 5 V. The magnitude of these outputs may be appropriately determined according to the entity of the unit main body 61 and the unit controller 62. As will be described later, since the entity of the unit controller 62 is a processor or the like, a power supply having an output smaller than that of the first power supply 63 can be used as the second power supply 64.

The unit controller 62 includes a processor and a memory, and the processor controls the operation of the unit main body 61. The processor also switches between a connected state and a disconnected state between the first power supply 63 and the unit main body 61. Power is supplied from the second power supply 64 to the unit controller 62.

Figure 5:
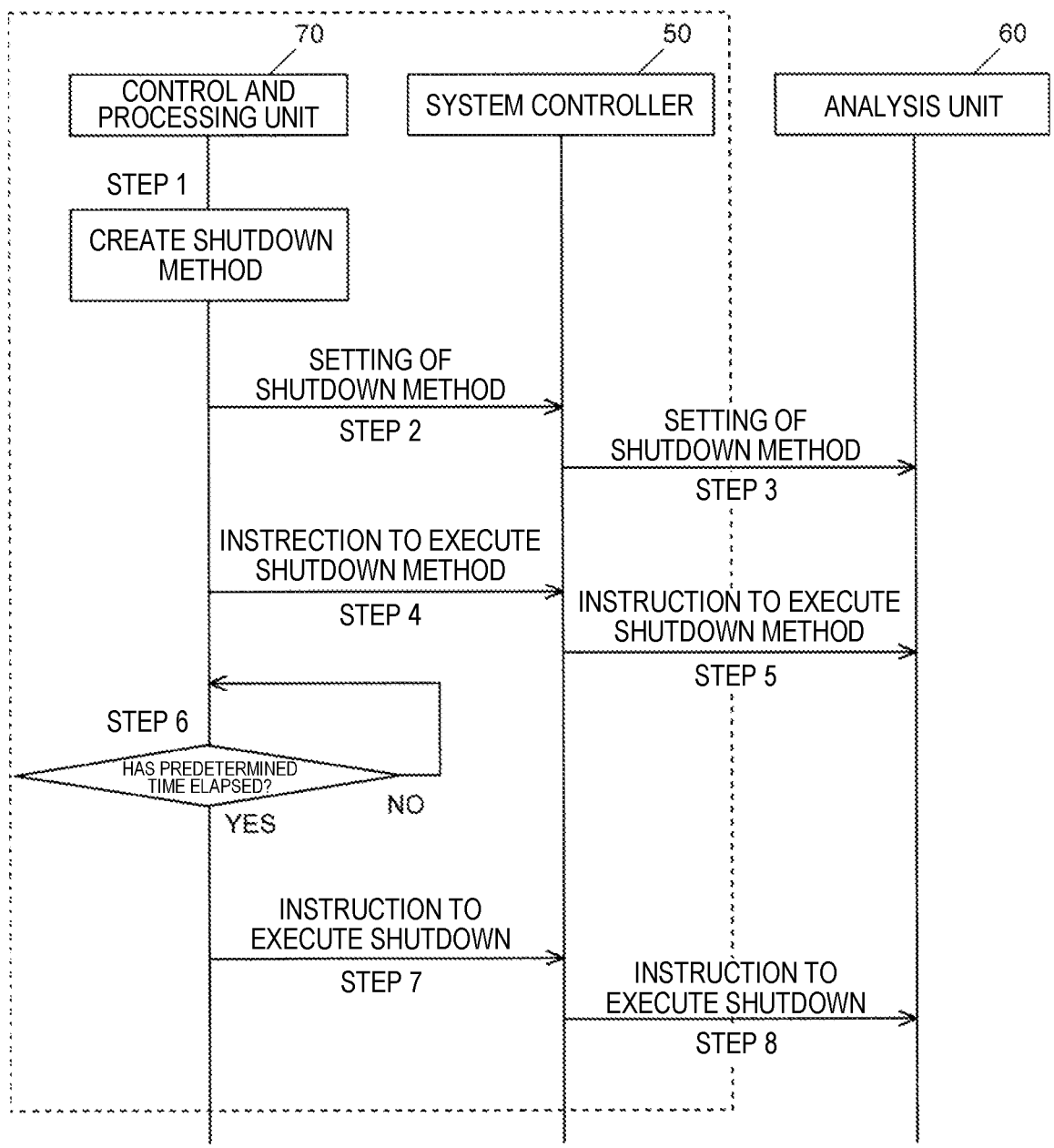
FIG. 5 is a flowchart for describing a flow of transition to a shutdown state in the present embodiment.

Next, with reference to FIGS. 4 and 5, in the liquid chromatograph 1 of the present embodiment, contents of a procedure and a process of the transition of the liquid chromatograph 1 to the shutdown state at the end of analysis will be described. The shutdown state refers to a state in which energization from the first power supply 63 to the unit main body 61 is stopped in some or all of the analysis units 60.

When the user gives an instruction for the transition to the shutdown state by a predetermined operation through the input unit 75, the setting input receiving unit 72 displays, on the display unit 76, a screen for allowing the user to select the analysis unit 60 to be transitioned to the shutdown state.

FIG. 4 is an example of a screen displayed by the setting input receiving unit 72. In this screen, the name of the analysis unit and the operation (for example, the operation to be stopped in the shutdown state of the liquid chromatograph 1) to be executed at the time of the transition to the shutdown state are described. Specifically, for example, in the liquid feeding unit 10, feeding of the mobile phase by the liquid feeding pumps 12a and 12b can be stopped. In the autosampler 20, the internal temperature control by the temperature control mechanism 21 can be stopped. In the column oven 30, the control of the temperature of the column 31 by the temperature control mechanism 32 can be stopped. In the detection unit 40, the lamp 42 can be turned off and the control of the temperature in the detection unit 40 by the temperature control mechanism 44 can be stopped. In FIG. 4, the shutdown state is set such that the operations of the liquid feeding unit 10, the column oven 30, and the detection unit 40 are stopped, and only the control of the temperature of the autosampler 20 is continued. This is an example set for the purpose of preventing volatilization and alteration of the sample by operating only the temperature control mechanism 21 of the autosampler 20. In addition, for example, in a case where the time until the next analysis is performed is relatively short, only the operation of the liquid feeding unit 10 can be set to be stopped.

When the user checks a check box of the analysis unit of which the operation is to be stopped at the time of shutdown, from among the analysis units displayed on the display unit 76, the method file creating unit 73 reads a command to stop the operation of the checked analysis unit from the storage unit 71, creates a method file (shutdown method file) for executing a shutdown process (step 1), and stores the method file in the storage unit 71. When the user checks the check box of the analysis unit 60, the setting input receiving unit 72 reads the required time for the preprocessing (cooldown) for the shutdown of the checked analysis unit 60 from the storage unit 71. Then, the longest time among the read times is displayed in a "cooldown time" field at the top of the screen.

Here, the case where the user selects the analysis unit to be stopped at the time of shutdown to create the shutdown method file has been described as an example, but in a case where the shutdown method file in which the contents of the preprocessing (cooldown) of the shutdown having the same contents is described has already been stored in the storage unit 71, it is only necessary to read the file.

When the shutdown method file is created by the method file creating unit 73 (or is read from the storage unit 71), the control execution unit 74 sets a shutdown method in the system controller 50 (step 2). When the shutdown method is set in the system controller 50, the control execution unit 74 displays a button for executing shutdown on the display unit 76.

When the shutdown method is set, the system controller 50 sets the shutdown method in the unit controller 62 of each analysis unit 60 (step 3). In the present embodiment, even in a case where the operation described in the shutdown method includes the contents relating to the operations of the plurality of analysis units 60, the contents are sent (broadcast) to each analysis unit 60 without being divided for each analysis unit 60. In the analysis unit 60, the unit controller 62 extracts a portion corresponding to the analysis unit 60 among the received methods and holds the extracted portion in the memory.

When the user presses a shutdown execution button displayed on the display unit 76, the control execution unit 74 instructs the system controller 50 to execute the shutdown method (step 4). The execution of the shutdown method as used herein does not mean execution of shutdown itself, but means execution of cooldown (preprocessing of shutdown) required before so-called shutdown. The cooldown is, for example, in the case of the liquid feeding unit 10, a process of gradually decreasing the liquid feeding flow rate of the mobile phase by the liquid feeding pumps 12a and 12b to zero. In the case of the autosampler 20 or the column oven 30, the cooldown is a process of gradually decreasing the output to the temperature control mechanisms 21 and 32 to zero. That is, the cooldown is a process of the transition to a state in which no problem occurs even if the energization from the first power supply 63 to the unit main body 61 is stopped in each analysis unit 60.

When the instruction to execute the shutdown method is received, the system controller 50 instructs each analysis unit 60 to execute the shutdown method (step 5).

In each analysis unit 60, when the instruction to execute the shutdown method is received, the unit controller 62 starts the cooldown of the unit main body 61.

The control execution unit 74 monitors an elapsed time from a time when the shutdown execution button is pressed by the user, and determines whether a predetermined time has elapsed (step 6). This predetermined time is the time displayed on the screen of the display unit 76 when the shutdown method is created, that is, the longest time among the times required for the cooldown in each analysis unit 60. Alternatively, the predetermined time may be a time obtained by adding a predetermined time (a time in consideration of a time required for communication between the respective units) to the longest time.

When the predetermined time has elapsed (YES in step 6), the control execution unit 74 instructs the system controller 50 to execute shutdown (step 7). When the instruction to execute the shutdown is received, the system controller 50 instructs each analysis unit 60 to execute shutdown (step 8). In addition, the control execution unit 74 displays a button for instructing shutdown cancellation on the display unit 76.

In each analysis unit 60, when the instruction to execute the shutdown is received, the unit controller 62 stops energization from the first power supply 63 to the unit main body 61. In this way, the transition to the shutdown state is completed. Even in the shutdown state, the energization from the second power supply 64 to the unit controller 62 is maintained.

In the liquid chromatograph of the present embodiment, in a case where the analysis is not performed for a while, for example, after the end of the analysis, the transition to the shutdown state is obtained by the above procedure, and thereby the energization from the first power supply 63 to the unit main body 61 is stopped in each analysis unit 60. Therefore, power consumption during analysis standby can be suppressed. In addition, even in the shutdown state, in each analysis unit 60, the energization from the second power supply 64 to the unit controller 62 is maintained, and communication with the system controller 50 is possible. Therefore, the shutdown state of each analysis unit 60 can be released via the system controller 50 by performing an operation of releasing the shutdown state from the control and processing unit 70.

Figure 6:
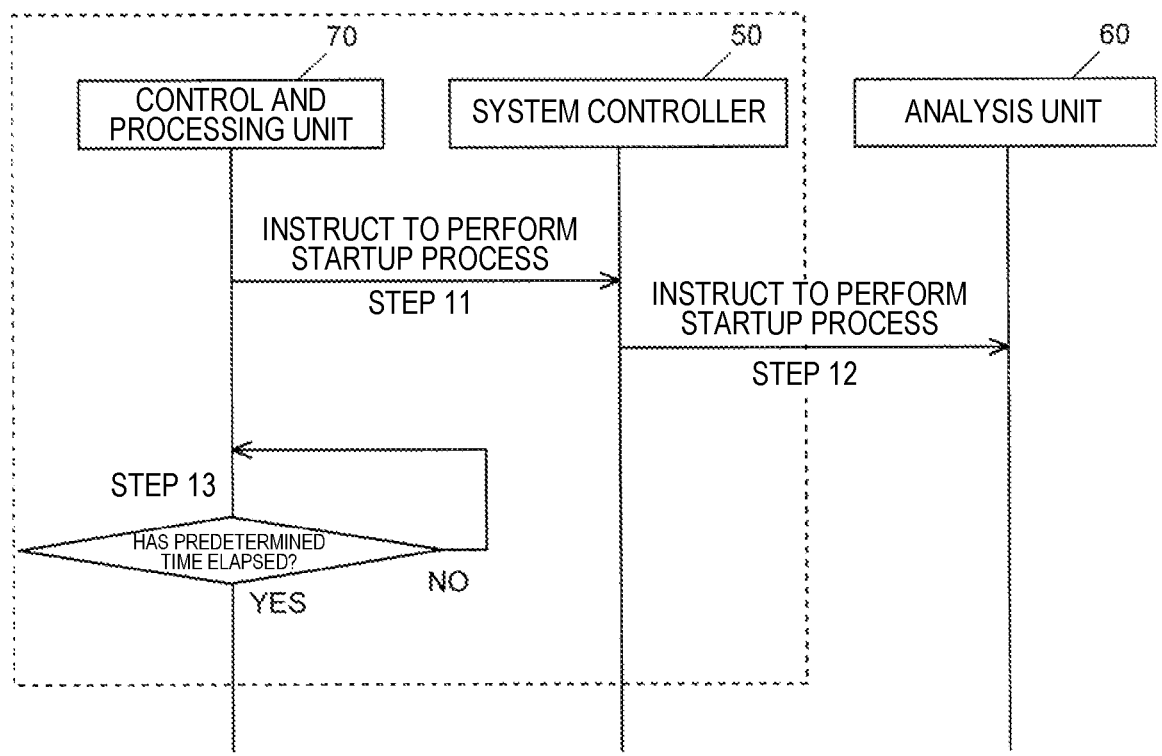
FIG. 6 is a flowchart for describing a flow of releasing a shutdown state in the present embodiment.

Next, a procedure for releasing the shutdown state will be described with reference to FIG. 6.

When the user presses a shutdown release button displayed on the display unit 76, the control execution unit 74 instructs the system controller 50 to start a startup process (step 11). The startup process refers to a process (automatic purge or warm-up) of the transition of each analysis unit 60 to an analyzable state (standby state). The automatic purge is a process of causing the mobile phase to flow through the flow path in the liquid chromatograph 1 to equilibrate the column 31.

When the instruction to start the startup process is received, the system controller 50 instructs each analysis unit 60 to start the startup process (step 12).

In each analysis unit 60, when the instruction to start the startup process is received, the unit controller 62 restarts the energization from the first power supply 63 to the unit main body 61 (in a case where the energization to the unit main body 61 has been stopped). The unit controller 62 further executes the automatic purge/warm-up of the unit main body after the energization to the unit main body 61 is restarted. Specifically, in the liquid feeding unit 10, the liquid feeding amount of the mobile phase by the liquid feeding pumps 12a and 12b is increased stepwise to a predetermined flow rate. In the autosampler 20, the temperature control is started such that the inside of the housing has a predetermined temperature. In the column oven 30, the temperature control is started such that the column 31 has a predetermined temperature. In the detection unit 40, the lamp 42 is turned on, and the temperature control is started such that the detection unit 40 has a predetermined temperature.

The control execution unit 74 monitors an elapsed time from a time when the shutdown release button is pressed by the user, and determines whether a predetermined time has elapsed (step 13). The predetermined time is the longest time among the times required for the automatic purge/warm-up in each analysis unit.

Through the above steps, the shutdown state of the liquid chromatograph 1 is released and becomes an analyzable state.

It should be noted that the control and processing unit 70 is used for easily setting and confirming details of the setting of the shutdown state on a screen created by software, and is not an essential configuration of the invention. In a case where the control and processing unit 70 is not used, the user may perform an operation relating to the setting/releasing of the shutdown state of the liquid chromatograph 1, in the system controller 50.

Figure 7:
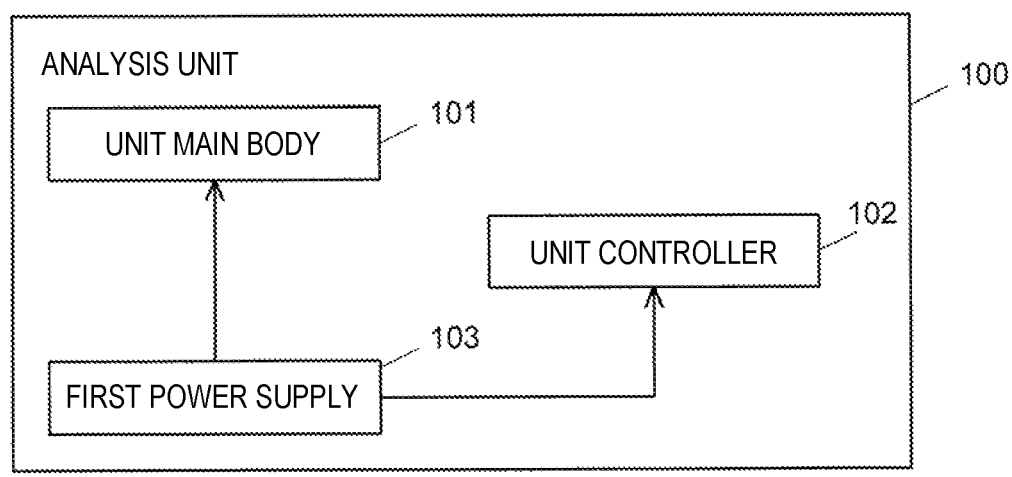
FIG. 7 is a diagram for describing a configuration of an analysis unit included in a liquid chromatograph of a modification.

Next, a liquid chromatograph of a modification will be described. In the liquid chromatograph of the above embodiment, all the analysis units 60 have the configuration illustrated in FIG. 3, but in the modification, some analysis units 100 have the configuration illustrated in FIG. 7. That is, some analysis units 100 have only a first power supply 103 common to a unit main body 101 and a unit controller 102. The analysis unit 100 is, for example, older than the analysis unit 60, and the unit controller 102 can process only a command for the analysis unit (does not support the broadcast).

In the liquid chromatograph of the modification, when the analysis units 60 and 100 are connected to the system controller 50, the system controller 50 determines the types of the connected analysis units 60 and 100. For example, a command that can be processed only in the analysis unit 60 is sent from the system controller 50 to each of the analysis units 60 and 100, and the type of the analysis unit is determined on the basis of the reaction (presence or absence of a response) to the command. The system controller 50 sends a determination result of the type of the analysis unit to the control and processing unit 70. The control and processing unit 70 stores information on the types of the analysis units 60 and 100 in the storage unit 71. Hereinafter, differences from the above embodiment will be described using a case where the detection unit 40 is an old analysis unit 100 as an example.

Also in the liquid chromatograph of the modification, when the user instructs the transition to the shutdown state by a predetermined operation through the input unit 75, the setting input receiving unit 72 displays a screen for allowing the user to select the analysis unit 60 of which the operation is to be stopped, on the display unit 76. However, the contents of the screen to be displayed are partially different from those in the above embodiment (FIG. 4).

FIG. 8 is an example of a screen displayed by the setting input receiving unit 72 in the modification. Also on this screen, the name of the analysis unit and the operation that can be stopped at the time of the transition to the shutdown state are displayed together with the check box. However, in the detection unit 40 which is the old analysis unit 100, when the energization from the first power supply 103 is stopped, the operation of the unit controller 102 is stopped, and thus the shutdown state of the analysis unit 100 cannot be released from the control and processing unit 70 or the system controller 50. Therefore, it is not possible to enter a check in the check box for the detection unit 40.

When the shutdown method file is created by the method file creating unit 73, the control execution unit 74 sets a shutdown method in the system controller 50. When the shutdown method is set, the system controller 50 sends (unicasts) a command instructing the detection unit 40 to transition to a sleep state, separately from commands for the other analysis units 60 (the liquid feeding unit 10, the autosampler 20, and the column oven 30). Similarly to the above embodiment, the contents of the set shutdown method are sent (broadcast) to the other analysis units 60 as they are (without separation). When the command is received, the detection unit 40 turns off the display unit (transitions to the sleep state). In addition, also in the case of performing automatic purge/startup, only the command for the detection unit 40 is sent separately from the commands for the other analysis units, and the sleep state of the detection unit 40 is released.

The above embodiment and modification are examples, and can be appropriately changed in accordance with the gist of the present invention.

Although the liquid chromatograph is used in both the above embodiment and modification, other unit type analysis devices can also be configured in the same manner as described above.

In the case of an analysis device that does not include the control and processing unit 70, in order to facilitate an operation relating to the setting/releasing of the shutdown state, a configuration can be obtained in which a predetermined analysis unit is transitioned to a shutdown state and such a shutdown state is released by pressing a predetermined button displayed on the screen of the system controller 50.

In a case where the system controller 50 does not have a screen, a power supply button may be set to be pressed for a long time when the system controller 50 is powered off, and a predetermined analysis unit may be transitioned to the shutdown state or the shutdown state may be released when the power supply button of the system controller 50 is pressed for a short time. Alternatively, the system controller 50 and a specific analysis unit 60 (for example, the liquid feeding unit 10) may have a cooperation function in advance, and a predetermined operation (for example, pressing the power supply button of the liquid feeding pumps 12a and 12b) may be performed in the analysis unit 60 to set/release the shutdown state of a predetermined analysis unit 60.

[Aspects]

It is understood by those skilled in the art that the plurality of exemplary embodiments described above are specific examples of the following aspects.

(First aspect)

An analysis device according to a first aspect of the invention includes one or a plurality of analysis units each including a unit main body that is a primary subject of an analysis operation, a first power supply configured to supply power to the unit main body, a unit controller configured to operate the unit main body according to a control signal input from an outside, and switch a connected state/disconnected state between the first power supply and the unit main body, and a second power supply configured to supply lower-voltage power to the unit controller than the first power supply; and a central controller configured to send a control signal to the unit controller of each of the one or plurality of analysis units.

The analysis device of the first aspect includes one or a plurality of analysis units and a central controller. Each analysis unit includes a unit main body that is a primary subject of an analysis operation, a first power supply configured to supply power to the unit main body, a unit controller configured to operate the unit main body and switch a connected state/disconnected state between the first power supply and the unit main body, and a second power supply configured to supply lower-voltage power to the unit controller than the first power supply. When a control signal instructing an analysis operation is input from the central controller to each unit, the unit controller of each analysis unit energizes the unit main body from the first power supply to make the unit main body operable (analysis state). Then, the unit controller operates the unit main body according to the control signal from the central controller. On the other hand, when a control signal instructing analysis standby is input from the central controller to each unit, the unit controller of each analysis unit stops the energization from the first power supply to the unit main body and causes a disconnected state (shutdown state). As described above, in the analysis device according to the invention, the shutdown state can be set by sending a predetermined control signal to the unit controller of the analysis unit by an input operation to the central controller. In this shutdown state, since the energization from the first power supply to the unit main body is stopped, power consumption can be suppressed.

On the other hand, since the energization from the second power supply to the unit controller is maintained in the analysis unit even in the shutdown state, the shutdown state can be released by sending a predetermined control signal from the central controller to the unit controller of the analysis unit.

(Second Aspect)

In an analysis device according to a second aspect of the invention, in the analysis device of the first aspect, the central controller sends a control signal for switching the first power supply to a disconnected state and a control signal for switching the first power supply to a connected state, to the unit controller of the one or plurality of analysis units, and the unit controller switches the first power supply to the disconnected state in response to the control signal for switching the first power supply to the disconnected state from the central controller, and switches the first power supply to the connected state in response to the control signal for switching the first power supply to the connected state from the central controller.

In the analysis device of the second aspect, the central controller sends a control signal for switching the first power supply to a disconnected state and a control signal for switching the first power supply to a connected state, to the unit controller of the one or plurality of analysis units, and the unit controller switches the first power supply between the disconnected state and the connected state according to the control signals. In the analysis device of the second aspect, since the central controller sends a control signal for switching the first power supply to a disconnected state and a control signal for switching the first power supply to a connected state, to the unit controller of the analysis unit and the unit controller is operated in replacement to each control signal, there is no need to perform a process such as replacement and conversion of the control signal in the unit controller, and the unit controller can be simply configured.

(Third Aspect)

In an analysis device according to a third aspect of the invention, in the analysis device of the first aspect or the second aspect, the central controller includes a setting input receiving unit configured to receive an input for specifying a target analysis unit of which the first power supply is switched to the disconnected state, from among the one or plurality of analysis units, and a shutdown method setting unit configured to set, in the unit controller, a shutdown method in which a predetermined process to be executed when the first power supply is switched to the disconnected state is described, for the analysis unit input to the setting input receiving unit, and the unit controller receives a shutdown method file sent from the central controller, and executes a process described in the shutdown method file.

In the analysis device of the third aspect, the transition to the shutdown state can be selectively made in units of analysis units. For example, in the liquid chromatograph, the time required from the start of energization from the first power supply to the liquid feeding pump of the liquid feeding unit to the feeding of the mobile phase at a predetermined flow rate is short, whereas it takes time to stabilize the temperature of the target part after the start of energization from the first power supply to the temperature control mechanism of the column oven or the detection unit. In the analysis device of the third aspect, in a case where the time required for warm-up varies depending on the analysis unit, it is possible to perform flexible operation such as the transition of only the analysis unit with a short time required to the shutdown state. In the above embodiment, the functions of the shutdown method setting unit are executed by the control execution unit 74 and the system controller 50.

(Fourth Aspect)

In an analysis device according to a fourth aspect of the invention, in the analysis device of the third aspect, the central controller stores a predetermined process to be executed in the one or plurality of analysis units when the first power supply is switched to the disconnected state, the central controller further includes a shutdown method file creating unit configured to create a shutdown method file in which a predetermined process to be executed when the first power supply is switched to the disconnected state is described, for the analysis unit input to the setting input receiving unit, and the shutdown method setting unit sets the shutdown method in the unit controller on a basis of the shutdown method file created by the shutdown method file creating unit.

In the analysis device of the fourth aspect, a predetermined process to be executed in the analysis unit when the first power supply is switched to the disconnected state is stored in the central controller, and the central controller includes a method file creating unit that creates a shutdown method file in which the predetermined process to be executed when the first power supply is switched to the disconnected state is described, for the analysis unit input to the setting input receiving unit. Therefore, when the analysis unit is input to the setting input receiving unit, it is possible to create the shutdown method file corresponding to the combination of the input analysis units each time. Therefore, it is not necessary to prepare shutdown method files corresponding to all combinations of the analysis units in advance.

(Fifth Aspect)

In an analysis device according to a fifth aspect of the invention, in the analysis device of the third or fourth aspect, the central controller further includes a display controller configured to display on a display unit, a time required for a predetermined process that takes a longest time to be executed, among the predetermined processes in the analysis unit input to the setting input receiving unit, when the first power supply is switched to the disconnected state.

In general, the time required for the predetermined process to be executed when the first power supply is switched to the disconnected state differs for each analysis unit. In the analysis device of the fifth aspect, only by checking the display unit, it is possible to easily grasp the required time for the predetermined process that takes the longest time to be executed, among the predetermined processes in each analysis unit input to the setting input receiving unit when the first power supply is switched to the disconnected state.

In the above embodiment, the function of the display controller is executed by the setting input receiving unit 72.

(Sixth Aspect)

In an analysis device according to a sixth aspect of the invention, in the analysis device of any one of the third aspect to the fifth aspect, the central controller sends a control signal for switching the first power supply to the disconnected state, to the unit controller of the analysis unit that is input to the setting input receiving unit, after a predetermined time elapses from a time when the unit controller starts executing the process described in the shutdown method file, and the unit controller switches the first power supply to the disconnected state in response to the control signal for switching the first power supply to the disconnected state, from the central controller.

In the analysis device of the sixth aspect, the first power supply is switched to the disconnected state after a predetermined time has elapsed from a time when the unit controller starts executing the process described in the shutdown method file. For example, by setting the required time to be equal to or longer than the time required for the predetermined process that takes the longest time to be executed among the predetermined processes in each analysis unit input to the setting input receiving unit when the first power supply is switched to the disconnected state, it is possible to reliably end the predetermined process in the analysis unit, and automatically switch the first power supply of each analysis unit to the disconnected state.

(Seventh Aspect)

In an analysis device according to a seventh aspect of the invention, in the analysis device of any one of the third aspect to the sixth aspect, the analysis device is a liquid chromatograph, the analysis device includes at least one of a liquid feeding unit, an autosampler, a column oven, and a detection unit as the analysis unit, and the predetermined process of the liquid feeding unit includes stopping liquid feeding of a mobile phase, the predetermined process of the autosampler includes stopping a temperature control, the predetermined process of the column oven includes stopping a temperature control, or the predetermined process of the detection unit includes turning off a lamp or stopping a temperature control.

The analysis device of the seventh aspect is a liquid chromatograph including at least one of a liquid feeding unit, an autosampler, a column oven, and a detection unit as an analysis unit, and the predetermined processing specific to each analysis unit can be appropriately combined and used.

(Eighth Aspect)

In an analysis device according to an eighth aspect of the invention, in the analysis device of any one of the first aspect to the seventh aspect, the central controller sends control signals for the one or plurality of analysis units to each analysis unit as they are, and the unit controller executes processing corresponding to the control signal relating to the analysis unit, from among the received control signals.

In the analysis device of the eighth aspect, since a process of dividing the control signals for each analysis unit is unnecessary, the transition time to the shutdown state can be shortened.

REFERENCE SIGNS LIST

1 . . . Liquid Chromatograph
10 . . . Liquid Feeding Unit
11a, 11b . . . Container
12a, 12b . . . Liquid Feeding Pump
13 . . . Mixer
20 . . . Autosampler
21 . . . Temperature Control Mechanism
30 . . . Column Oven
31 . . . Column
32 . . . Temperature Control Mechanism
40 . . . Detection Unit
41 . . . Flow Cell
42 . . . Lamp
43 . . . Spectroscopic Detector
44 . . . Temperature Control Mechanism
50 . . . System Controller
60, 100 . . . Analysis Unit
61, 101 . . . Unit Main Body
62, 102 . . . Unit Controller
63, 103 . . . First Power Supply
64 . . . Second Power Supply
70 . . . Control and Processing Unit
71 . . . Storage Unit
72 . . . Setting Input Receiving Unit
73 . . . Method File Creating Unit
74 . . . Control Execution Unit
75 . . . Input Unit
76 . . . Display Unit
80 . . . Flow Path
90 . . . Communication Cable

The invention claimed is:

1. A chromatography analysis device comprising:
a plurality of analysis units, wherein each of the analysis units includes:
  a unit main body that is a primary subject of an analysis operation,
  a first power supply configured to supply power to the unit main body,
  a unit controller configured to operate the unit main body according to a control signal input from an outside, and switch into either a connected state in which the first power supply and the unit main body are electrically connected or a disconnected state in which the first power supply and the unit main body are electrically disconnected, and
  a second power supply configured to supply lower-voltage power to the unit controller than the first power supply; and
a central controller configured to send a control signal to the unit controller of each of the plurality of analysis units,
wherein each of the plurality of analysis units is a liquid feeding unit, an autosampler, a column oven, or a detection unit.

2. The analysis device according to claim 1,
wherein the central controller is configured to send a control signal for switching the first power supply to a disconnected state and a control signal for switching the first power supply to a connected state, to the unit controller of each of the plurality of analysis units, and
the unit controller of each of the plurality of analysis units is configured to switch the first power supply to the disconnected state in response to the control signal for switching the first power supply to the disconnected state from the central controller, and switches the first power supply to the connected state in response to the control signal for switching the first power supply to the connected state from the central controller.

3. The analysis device according to claim 1,
wherein the central controller is configured to send control signals for the plurality of analysis units to each analysis unit as they are, and
the unit controller of each of the plurality of analysis units is configured to execute processing corresponding to the control signal relating to the analysis unit, from among the received control signals.

4. The analysis device according to claim 1,
wherein the central controller is configured to include
a setting input receiving unit configured to receive an input for specifying a target analysis unit of which the first power supply is switched to the disconnected state, from among the plurality of analysis units, and
a shutdown method setting unit configured to set, in the unit controller of the target analysis unit input to the setting input receiving unit, a shutdown method in which a predetermined process to be executed when the first power supply is switched to the disconnected state is described, for the target analysis unit input to the setting input receiving unit, and
the unit controller of each of the plurality of analysis units is configured to execute a process described in the shutdown method set by the shutdown method setting unit.

5. The analysis device according to claim 4,
wherein the central controller is configured to store a predetermined process to be executed in the plurality of analysis units when each of the first power supplies is switched to the disconnected state,
the central controller is further configured to include a shutdown method file creating unit configured to create the shutdown method file in which a predetermined process to be executed when the first power supply of the target analysis unit input to the setting input receiving unit is switched to the disconnected state is described, for the target analysis unit input to the setting input receiving unit, and
the shutdown method setting unit sets the shutdown method in the unit controller of the target analysis unit input to the setting input receiving unit on a basis of the shutdown method file created by the shutdown method file creating unit.

6. The analysis device according to claim 4,
wherein the central controller is further configured to include a display controller configured to display on a display unit, a time required for a predetermined process that takes a longest time to be executed, among the predetermined processes in the target analysis unit input to the setting input receiving unit, when the first power supply of the target analysis unit input to the setting input receiving unit is switched to the disconnected state.

7. The analysis device according to claim 4,
wherein the central controller is configured to send a control signal for switching the first power supply of the target analysis unit input to the setting input receiving unit to the disconnected state, to the unit controller of the target analysis unit that is input to the setting input receiving unit, after a predetermined time elapses from a time when the unit controller of the target analysis unit input to the setting input receiving unit starts executing the process described in the shutdown method file, and the unit controller of each of the plurality of analysis units is configured to switch the first power supply to the disconnected state in response to the control signal for switching the first power supply to the disconnected state, from the central controller.

8. The analysis device according to claim 4, wherein the analysis device is a liquid chromatograph, the plurality of analysis units includes at least one of a liquid feeding unit, an autosampler, a column oven, or a detection unit, and the predetermined process of the liquid feeding unit includes stopping liquid feeding of a mobile phase, the predetermined process of the autosampler includes stopping a temperature control, the predetermined process of the column oven includes stopping a temperature control, or the predetermined process of the detection unit includes turning off a lamp or stopping a temperature control.

* * * * *